US012089308B2

(12) United States Patent
Otten

(10) Patent No.: US 12,089,308 B2
(45) Date of Patent: Sep. 10, 2024

(54) LED END OF LIFE DETECTION

(71) Applicant: eldoLAB Holding B.V., Son en Breugel (NL)

(72) Inventor: Dhr. Andy Johanna Elisabeth Otten, Wassenberg (DE)

(73) Assignee: eldoLAB Holding B.V., Son en Breugel (NL)

( * ) Notice: Subject to any disclaimer, the term of this patent is extended or adjusted under 35 U.S.C. 154(b) by 168 days.

(21) Appl. No.: 17/788,607

(22) PCT Filed: Dec. 24, 2020

(86) PCT No.: PCT/EP2020/087859
§ 371 (c)(1),
(2) Date: Jun. 23, 2022

(87) PCT Pub. No.: WO2021/130361
PCT Pub. Date: Jul. 1, 2021

(65) Prior Publication Data

US 2023/0075898 A1 Mar. 9, 2023

(30) Foreign Application Priority Data

Dec. 24, 2019 (NL) ...................................... 2024577

(51) Int. Cl.
*H05B 45/58* (2020.01)
*H05B 45/56* (2020.01)

(52) U.S. Cl.
CPC ............. *H05B 45/58* (2020.01); *H05B 45/56* (2020.01)

(58) Field of Classification Search
CPC ................................ H05B 45/58; H05B 45/56
USPC ........................................................... 315/307
See application file for complete search history.

(56) References Cited

U.S. PATENT DOCUMENTS

| | | | | |
|---|---|---|---|---|
| 9,414,460 | B2 * | 8/2016 | Bender | H05B 45/50 |
| 9,668,317 | B2 * | 5/2017 | LeSaffre | H05B 45/58 |
| 2011/0089855 | A1 * | 4/2011 | Roberts | H05B 47/20 340/654 |

(Continued)

FOREIGN PATENT DOCUMENTS

| | | | | |
|---|---|---|---|---|
| FR | 3058603 A1 * | 5/2018 | | H04B 10/116 |
| WO | WO-2015097476 A2 * | 7/2015 | | F21V 23/0457 |

OTHER PUBLICATIONS

International Search Report and Written Opinion for International Application No. PCT/EP2020/087859, dated Mar. 18, 2021, 14 pages.

*Primary Examiner* — Ryan Jager
(74) *Attorney, Agent, or Firm* — Buchanan Ingersoll & Rooney PC

(57) ABSTRACT

An LED driver measures a voltage across the LED and a temperature associated with the LED. The LED driver drives the LED to operate below a knee in the voltage/current curve of the LED and derives an expected voltage across the LED from the temperature of the LED, the LED driving current, and a predetermined relation between the expected LED voltage and at least one of LED temperature and LED driving current. The LED driver determines if the measured voltage across the LED exceeds the expected voltage across the LED, and establishes, based on the determination, if an LED approaching end of life warning is to be generated. Thus, an approaching end of life may be determined by the LED driver while the LED is still operational.

12 Claims, 5 Drawing Sheets

(56) References Cited

U.S. PATENT DOCUMENTS

| | | | | |
|---|---|---|---|---|
| 2011/0193484 | A1* | 8/2011 | Harbers | F21V 29/773<br>362/85 |
| 2016/0338171 | A1* | 11/2016 | Bhagat | F21V 23/0471 |
| 2023/0075898 | A1* | 3/2023 | Otten | H05B 45/56 |

* cited by examiner

LED END OF LIFE DETECTION

CROSS-REFERENCE TO RELATED APPLICATIONS

This application is a 371 filing of International Application No. PCT/EP2020/087859, filed Dec. 24, 2020, which claims priority to Netherlands Application No. NL 2024577, filed Dec. 24, 2019. The disclosure of these applications is incorporated herein by reference in their entireties for all purposes.

FIELD OF THE INVENTION

The present invention relates to an LED driver for driving an LED as well as to a method of driving an LED.

BACKGROUND OF THE INVENTION

LEDs tend to have a relatively long operating life while showing a relatively constant performance during their operating life. Nevertheless, the LEDs are prone to fail once an end of life has been reached.

U.S. Pat. No. 9,414,460 B2 discloses driving LEDs by superimposing a test current on each LED, one at a time, and measuring the forward voltage of each one of the LEDs. The forward voltage of the LED is used to determine environmental effects and/or aging effects on the LED.

A problem is that the operation of the LED will result in dissipation, hence influencing an operating temperature of the LED. The forward voltage of the LED changes as a function of temperature. Thus, as the LED is operated, a temperature of the LED may be affected, which in turn affects a forward voltage of the LED. As LED forward voltage changes may result from aging and from temperature change, this method is relatively un-reliable.

SUMMARY OF THE INVENTION

The invention aims to provide a more reliable indication that end of life of an LED is approaching.

In order to achieve this goal, according to an aspect of the invention, there is provided an LED driver for driving an LED, the LED driver comprising

- a power supply configured to power the LED,
- a control device configured to control the power supply to power the LED to operate the LED at a first electrical quantity and at a second electrical quantity, wherein the first electrical quantity is one of a voltage across the LED and a current through the LED and the second electrical quantity is the other one of the voltage across the LED and the current through the LED,
- wherein the control device comprises a measurement input connected to the LED and configured to measure the first electrical quantity, and
- a temperature sensor thermally coupled to the LED and configured to measure a sensor temperature indicative of a temperature of the LED, the temperature sensor comprising an output connected to a temperature measurement input of the control device wherein the control device is configured to:

a) control the power supply to power the LED thereby driving the LED to operate at a predetermined value of the second electrical quantity, the predetermined value of the second electrical quantity being set to operate the LED below a knee voltage of the LED, b) derive an indicative temperature of the LED from the sensor temperature obtained from the temperature sensor, c) measure by the measurement input a value of the first electrical quantity, d) derive an expected value of the first electrical quantity from the indicative temperature of the LED, the predetermined value of the second electrical quantity, and a predetermined relation between

- the expected value of the first electrical quantity and
- at least one of LED temperature and the second electrical quantity, e) determine if the measured value of the first electrical quantity deviates from the expected value of the first electrical quantity, and f) establish, based on the determination, if an LED approaching end of life warning is to be generated, and g) output the LED end of life warning in case the LED approaching end of life warning has been generated.

In accordance with the invention, the LED may either be driven at an LED drive current, whereby the voltage across the LED is measured, or the LED may be driven at an LED drive voltage, whereby the current through the LED is measured. Accordingly, in case the LED is driven by at an LED drive current, whereby the voltage across the LED is measured, the invention may be phrased as an LED driver for driving an LED, the LED driver comprising

- a power supply configured to power the LED,
- a control device configured to control the power supply to power the LED,
- wherein the control device comprises a measurement input connected to the LED and configured to measure a voltage across the LED, and
- a temperature sensor thermally coupled to the LED and configured to measure a sensor temperature indicative of a temperature of the LED, the temperature sensor comprising an output connected to a temperature measurement input of the control device wherein the control device is configured to:

a) control the power supply to provide an LED driving current to power the LED, the LED driving current being set to operate the LED below a knee voltage of the LED, b) derive an indicative temperature of the LED from the sensor temperature obtained from the temperature sensor, c) measure a voltage across the LED, d) derive an expected voltage across the LED from the indicative temperature of the LED, the LED driving current, and a predetermined relation between the expected LED voltage and at least one of LED temperature and LED driving current, e) determine if the measured voltage across the LED deviated from the expected voltage across the LED, and f) establish, based on the determination, if an LED approaching end of life warning is to be generated, and g) output the LED approaching end of life warning in case the LED end of life warning has been generated.

The LED driver comprises a power supply such as a switched mode power supply or a linear power supply. The power supply may comprise an output connected to the LED of a current source type ("constant current"), a voltage source type ("constant voltage"), or having certain output impedance. A control device, such as a microcontroller a digital control circuit or a linear control circuit, controls the power supply to provide an LED driving current, e.g. in accordance with a setpoint provided to the control device. The Light Emitting Diode, LED, may be formed by a single LED diode or by an assembly thereof, such as plural series connected LEDs.

The control device comprises a voltage measurement input, e.g. an analogue to digital converter input which is connected, e.g. via a coupling circuit such as a voltage divider, to the LED in order to measure a voltage across the LED. Alternatively, the LED may be driven at an LED drive voltage, whereby the current through the LED is measured.

Also, temperature information is provided to the control device, Thereto, a temperature sensor is configured to measure a quantity indicative of a temperature of the LED, the temperature sensor comprises a sensor output connected to a temperature measurement input of the control device. For example, the control device may, e.g. using an analogue to digital converter, convert the signal at the temperature sensor input into a digital signal. As another example, the temperature sensor may comprise an analogue to digital converter, thus the temperature sensor may output a digital signal.

In order to establish if the LED approaches an end of life, the control device may be configured to operate the LED at an LED driving current which is preferably a current that operates the LED below or at a knee voltage of the LED. The term knee voltage is to be understood as the voltage at which a knee in the voltage versus current curve of the LED occurs, i.e. the forward voltage as of which the forward current of the LED starts to rise rapidly, i.e. the forward voltage as of which the LED starts conducting. At this driving current, the control device measures a voltage across the LED and measures the temperature using the temperature sensor. Alternatively, the LED may be driven at an LED drive voltage, preferably below the knee voltage, whereby the current through the LED is measured.

The control device is configured to determine an indicative temperature of the LED from the temperatures as measured by the temperature sensor. For example, the control device may approximate the temperature of the LED junction to be the same as the temperature as measured by the temperature sensor. In another embodiment, thermal resistance between the LED and the temperature sensor may be taken into account as described in more detail below.

The control device is configured to derive an expected voltage across the LED (respectively current through the LED in the case of driving the LED at a predetermined voltage) from the indicative temperature and the LED driving current (resp. LED driving voltage) at which the LED is driven. The expected voltage (respectively current through the LED) may for example be derived from pre-stored data in a memory of the control device. The pre-stored data may take the form of one or more tables, one or more (mathematical) functions or one or more coefficients of such function(s). The pre stored value may for example be obtained by the control device when obtaining configuration data that reflects a type and/or configuration of the LED(s) as connected to the driver.

The pre-stored data may for example comprise forward voltage data (resp. LED current data) as a function of temperature and/or as a function of LED driving current (resp. LED driving voltage). For example, a plurality of expected forward voltages (resp. currents) may be stored, each expressing the expected forward voltage (resp. current) at a different temperature, thus providing a sequence of expected forward voltages (resp. currents) as a function of temperature. Thereby, the expected forward voltage (resp. current) may be accurately determined at a predetermined forward current (resp. at a predetermined LED driving voltage). In an embodiment, similar curves may be provided at plural values of the forward current (resp. at plural values of the voltage across the LED) The control device compares the measured voltage across the LED to the expected voltage across the LED. In case an end of life approaches, the LED forward voltage across the LED at the measured temperature tends to increase, which will reflect in the comparison of the measured voltage across the LED with the expected voltage across the LED. In case the first electrical quantity is the voltage across the LED and the second electrical quantity is the current through the LED, it is determined if the measured voltage increased in respect of the expected value.

Similarly, in the case of driving the LED at a predetermined LED voltage, the control device compares the measured current through the LED to the expected current through the LED. In case an end of life approaches, the LED current at the measured temperature tends to decrease, which will reflect in the comparison of the measured current through the LED with the expected current through the LED. In case the first electrical quantity is the current through the LED and the second electrical quantity is the voltage across the LED, it is determined if the measured current through the LED decreased in respect of the expected value.

Accordingly, the control device generates an approaching end of life warning that expresses an approaching end of life in case such a deviation may be derived from the comparison. In case the approaching end of life warning is generated, the control device outputs the approaching end of life warning. The warning may be transmitted in various ways. For example, the control device may transmit the approaching end of life warning to a remote server, such as a remote maintenance server. As another example, the control device may control the power supply to drive the LED to signal that end of life is imminent, for example by driving the LED to deviate from normal, expected operation, for example to blink at a predetermined frequency visible for human perception, to operate at a predetermined color signaling end of life, etc.

Accordingly, the LED driver may be defined as: an LED driver for driving an LED, the LED driver comprising

- a power supply configured to power the LED,
- a control device configured to control the power supply to power the LED to operate the LED at a first electrical quantity and at a second electrical quantity, wherein the first electrical quantity is one of a voltage across the LED and a current through the LED and the second electrical quantity is the other one of the voltage across the LED and the current through the LED,
- wherein the control device comprises a measurement input connected to the LED and configured to measure the first electrical quantity, and
- a temperature sensor thermally coupled to the LED and configured to measure a sensor temperature indicative of a temperature of the LED, the temperature sensor comprising an output connected to a temperature measurement input of the control device wherein the control device is configured to:

a) control the power supply to power the LED thereby driving the LED to operate at a predetermined value of the second electrical quantity, the predetermined value of the second electrical quantity being set to operate the LED below a knee voltage of the LED, b) derive an indicative temperature of the LED from the sensor temperature obtained from the temperature sensor, c) measure by the measurement input a value of the first electrical quantity, d) derive an expected value of the first electrical quantity from the indicative temperature of the LED, the predetermined value of the second electrical quantity, and a predetermined relation between the expected value of the first electrical quantity and at least one of LED temperature and the second electrical quantity, e) determine if the measured value of the first electrical quantity deviates from the expected value of the first electrical quantity, comprising, in case the first electrical quantity is the voltage across the LED and the second electrical quantity is the current through the LED, determining if the measured voltage increased in respect of the expected value, and in case the first electrical quantity is the current through the LED and the second electrical quantity is the voltage across the LED, determining if the measured current through the LED decreased in respect of the expected value, and f) establish, based on the determination, if an LED approaching end of life warning is to be generated, from an increase of the measured voltage in respect of the expected value, in case the first electrical quantity is the voltage across the LED and the second electrical quantity is the current through the LED, respectively from a decrease of the measured current through the LED in respect of the expected value, in case the first electrical quantity is the current through the LED and the second electrical quantity is the voltage across the LED, and g) output the LED approaching end of life warning in case the LED approaching end of life warning has been generated.

Accordingly, in f) an LED approaching end of life warning is generated from an increase of the measured voltage in respect of the expected value, in case the first electrical quantity is the voltage across the LED and the second electrical quantity is the current through the LED, respectively from a decrease of the measured current through the LED in respect of the expected value, in case the first electrical quantity is the current through the LED and the second electrical quantity is the voltage across the LED.

The end of life warning may be dependent on the extent of deviation from the expected LED voltage and/or LED current. For example, the control device may output a first end of life warning associated with a first extent of deviation to indicate that preventing maintenance may be required, and a second end of life warning associated with a second, larger extent of deviation to indicate that corrective maintenance may be required, As the forward voltage is measured by the control device when the power supply operates the LED at an LED driving current at or below the knee voltage (or the current through the LED being measured while a forward voltage being applied at or below the knee voltage), a dissipation of the LED is relatively small, as the LED current is relatively small. At or below the knee current, the LED may be non-operational, in that the LED does not emit light. As a result of the low dissipation of the LED, a temperature rise of the LED may be relatively small, enabling a stable and accurate temperature measurement, as the temperature of the LED will remain relatively low causing a temperature gradient from the LED junction to the temperature sensor to be relatively low.

The approaching end of life may be determined in an accurate way, as the voltage rise (resp. current reduction when driving at a constant voltage) at or below the knee of the LED curve appeared to relate to the degree of aging of the LED. Hence, the procedure as described may provide for an indication of the age of the LED that is more accurate than the measurement of accumulated LED operating hours, as the operating hours do not take account in full of aging effects such as temperature level, drive current level, effective pulse width, height of peak currents, occurred overload, occurred over temperature, etc.

In an embodiment, the temperature sensor is thermally connected to a heat sink of the LEDs, and the control device is configured to derive the indicative temperature of the LED by estimating a junction temperature of the LED from the temperature as measured by the temperature sensor and a thermal resistance from the LED junction to the heat sink. Hence, the junction temperature of the LED may be accurately estimated from the temperature of the heat sink, which is measured by the temperature sensor, and the thermal resistance between the junction of the LED and the heat sink.

Furthermore, the thermal resistance between the heat sink and the temperature sensor may additionally be taken into account. Hence, an accurate estimation of the junction temperature may be provided, thus taking account of a dependency of the LED forward voltage (at a constant LED driving current), resp of the LED current (at a constant LED driving voltage) from the LED junction temperature.

For further accuracy, the control device may further be configured to estimate the junction temperature of the LED from an estimated dissipation of the LED, the control device being configured to estimate the dissipation from the measured voltage across the LED and the LED driving current (resp. from the measured current through the LED and the LED driving voltage). At or below the knee voltage the LED may not be emitting light, causing the (relatively low) LED power consumption formed by the LED drive current times the voltage across the LED to result in dissipation. The dissipation may be estimated relatively accurately, as both the voltage across the LED and the current through the LED are known to the control device (the LED voltage being measured and the LED current being controlled). Thus, from the LED dissipation and the thermal resistance from LED junction to heat sink and the thermal resistance from heat sink to temperature sensor, an accurate estimation of LED junction temperature may be derived.

In order to determine if the LED forward voltage exhibits a rise as observed when nearing end of life, in an embodiment, the comparing the measured voltage across the LED to the expected voltage across the LED comprises:

determining if the measured voltage across the LED exceeds the expected voltage across the LED, by a predetermined threshold.

Alternatively, in case the LED forward voltage is driven at a predetermined value, while the LED current is measured, a decrease in the LED current at a constant forwards LED voltage, as observed when nearing end of life, is detected by comparing the measured current through the LED to the expected current through the LED, comprising determining if the measured current through the LED underceeds, i.e. falls below the expected current through the LED by a predetermined threshold.

The expected voltage across the LED may form a forward voltage across the LED as expected when the LED is for example mid-life or new, hence, an increase as compared to the mid-life or new forward voltage may be detected by using the threshold. Alternatively, when driving at a constant voltage, the expected current through the LED may form a current through the LED as expected when the LED is for example mid-life or new, hence, an decrease as compared to the mid-life or new LED current may be detected by using the threshold. The threshold may for example be a constant value. In another embodiment, the threshold may be temperature dependent and/or dependent on the type of LED, thus enabling to take account of temperature and/or type of LED in the determination. The threshold may be stored in a memory of the control device, for example as a predetermined threshold irrespective of the type of LED or may be loaded into the control device as part of configuration data, e.g. upon installation of the LED and driver. In another embodiment, the threshold may be formed by a predetermined fraction of the expected forward voltage resp. forward current.

Accordingly, when making use of different LED configurations, such as a single LED or plural series connected LEDs, the corresponding rise in forward voltage of the plural LEDs may reflect into a correspondingly larger rise in the LED forward voltage when nearing end of life. Accordingly, using a predetermined fraction of the expected LED forward voltage as the threshold voltage, the (e.g. cumulative) effects of series connections may be taken into account. Similarly, a cumulative effect may occur when driving plural LEDs (e.g. in series or parallel) at a predetermined constant overall voltage.

As mentioned above, in an embodiment, the deriving the expected voltage across the LED from the quantity indicative of the temperature of the LED and the LED driving current comprises:

fetching the expected voltage across the LED from a memory having stored therein the expected voltage across the LED at the junction temperature and the LED driving current.

Likewise, in the case of driving the LED at the predetermined voltage and measuring the LED current, the deriving the expected current through the LED from the quantity indicative of the temperature of the LED and the LED driving voltage comprises:

fetching the expected current through the LED from a memory having stored therein the expected current through the LED at the junction temperature and the LED driving voltage In an embodiment, the expected forward voltage is calibrated based on measurement data, In that, in an embodiment, the control device is configured to store the measured voltage across the LED in the memory upon receiving an LED forward voltage calibration command. Similarly, in the case of LED voltage drive, whereby the LED current is measured, the expected current through the LED is calibrated based on measurement data, In that, in an embodiment, the control device is configured to store the measured current through the LED in the memory upon receiving an LED current calibration command. The calibration command may for example be triggered when the LED has been replaced by a new one or upon taking into operation of a newly installed LED lighting system of which the LED driver and LED form part. Thus, the detection of approaching end of life may be made more accurate, as exemplary tolerances in LED forward voltage versus LED current relation may be taken into account, by the calibration. Furthermore, differences in LED forward voltage versus LED current for different LED colors, such as RED, YELLOW, GREEN, BLUE, WHITE, as well as differences in LED forward voltage versus LED current due to LED usage of different semiconductor materials, e.g. silicon, InGaAs, etc., may be taken into account by the initial measurement.

Alternatively, the pre-stored value as stored in the memory of the control device may take account of the LED configuration, such as color, semiconductor material, type and circuit configuration of the LEDs as mentioned above.

In order to perform the measurement at a stable junction temperature condition, in an embodiment, the control device is configured to perform a)-c) during a power-up procedure of the LED driver. Hence, during power up, i.e. when the LED has not been operational yet, the LED junction may be at a stable temperature, e.g. at an ambient temperature. Accordingly, a low temperature gradient between the LED junction and the temperature sensor may be provided, hence promoting an accurate estimation of the junction temperature from the temperature measured by the temperature sensor.

As another example to perform the measurement at a stable junction temperature, in an embodiment, the control device may be configured to perform a)-c) during an LED off time in an LED modulation cycle. A heat sink to which the LED is connected may exhibit a relative long thermal time constant. The LED junction however, taking account of the relatively low volume and weight of the semiconductor material, may exhibit a relatively short thermal time constant. Thus, in case the LED is switched off, e.g. in an off-time of the pulse width modulation time scheme, the temperature of the LED junction will relatively quickly decrease in a direction towards the temperature of the heat sink, hence resulting, within a relatively short time frame, in a relatively low temperature gradient between the LED junction and the heat sink. In order to compensate the intensity for the off time of the LED for temperature stabilization and forward voltage measurement, the control device may increase an LED current and/or LED on time after the measurement.

The LED power supply which powers the LED may drive the LED at an LED illumination drive current when driving the LED to illuminate light. Accordingly, when a)-c) are performed during an off time in the LED modulation scheme, the power supply may be driven to operate at a lower LED driving current so as to operate the LED below the knee voltage. Alternatively, the power supply may change from driving the LED at the LED illumination drive current, i.e. from current source operation, into constant voltage driving at or below the knee voltage.

As a further example to perform the measurement at a stable junction temperature, in an embodiment, a relation between the voltage across the LED and temperature is stored in the memory of the control device, the control device being configured to:

derive a further indicative temperature of the LED from the voltage across the LED and the stored relation between the voltage across the LED and temperature, compare the indicative temperature of the LED to the further indicative temperature of the LED, and perform d) to g) in case a difference between the indicative temperature of the LED and the further indicative temperature of the LED is less than a predetermined temperature stability threshold.

Similarly, in the case of driving the LED at the predetermined forward voltage, a relation between the current through the LED and temperature is stored in the memory of the control device, the control device being configured to:

derive a further indicative temperature of the LED from the current through the LED and the stored relation between the current through the LED and temperature, compare the indicative temperature of the LED to the further indicative temperature of the LED, and perform d) to g) in case a difference between the indicative temperature of the LED and the further indicative temperature of the LED is less than a predetermined temperature stability threshold.

The voltage across the LED has been measured by the control device. As the voltage across the LED is temperature dependent, the measured voltage across the LED may be applied to estimate a temperature of the LED junction therefrom. In the memory of the control device, a relation between LED voltage and LED temperature is stored, for example at the LED drive current. The relation may be stored in a form of a look up table or in a form of a mathematic function, such as a polynomial. The control device determines a further indication of the temperature of the LED from the measured voltage at the known LED current, and compares the further indicative temperature to the previously described indicative temperature.

Similarly, in the case of driving the LED at the predetermined forward voltage: in an embodiment, the current through the LED has been measured by the control device. As the current through the LED is temperature dependent, the measured current through the LED may be applied to estimate a temperature of the LED junction therefrom. In the memory of the control device, a relation between LED current and LED temperature is stored, for example at the LED drive voltage. The relation may be stored in a form of a look up table or in a form of a mathematic function, such as a polynomial. The control device determines a further indication of the temperature of the LED from the measured current at the known LED voltage, and compares the further indicative temperature to the previously described indicative temperature.

In case of a low difference between these temperatures (as for example reflected by a predetermined temperature stability threshold stored in the memory of the control device), the control device may establish that the temperature determination is reliable, hence proceeding to d) and further steps. Thereby, adverse effects on the temperature of the LED, for example heating of the LED as a result of the operation of other LEDs or heating of the LED as a result of a previous operation of the LED or any other cause of deviation, may be taken into account. Thereby, the approaching end of life determination may be performed more accurately, as disturbances that may affect the temperature of the LED junction may be detected and/or taken into account.

As a still further example to perform the measurement at a stable junction temperature, in an embodiment, the control device is configured to measure the voltage across the LED at a first moment in time and to measure the voltage across the LED at a second moment in time, to derive a time gradient of the voltage across the LED from a difference between the voltage across the LED at the first moment in time and the voltage across the LED at the second moment in time and an elapsed time between the first moment in time and the second moment in time, and to perform d) to g) in case the time gradient of the voltage across the LED is lower than a predetermined voltage gradient.

Similarly, in the case of driving the LED at the predetermined forward voltage: in an embodiment, the control device is configured to measure the current through the LED at a first moment in time and to measure the current through the LED at a second moment in time, to derive a time gradient of the current through the LED from a difference between the current through the LED at the first moment in time and the current through the LED at the second moment in time and an elapsed time between the first moment in time and the second moment in time, and to perform d) to g) in case the time gradient of the current through the LED is lower than a predetermined current gradient.

The LED driving current resp. LED driving voltage may be kept at a same value during the first moment in time and the second moment in time. Hence, a stable, low voltage or current gradient measurement if the voltage across the LED may signal a stable temperature of the LED junction, making use of the fact that the voltage across the LED resp. current through the LED may be temperature dependent.

According to another aspect, there is provided a method of driving an LED to operate the LED at a first electrical quantity and at a second electrical quantity, wherein the first electrical quantity is one of a voltage across the LED and a current through the LED and the second electrical quantity is the other one of the voltage across the LED and the current through the LED, the method comprising a) controlling a power supply to provide current predetermined value of the second electrical quantity to power the LED, the predetermined value of the second electrical quantity being set to operate the LED below a knee voltage of the LED,
b) deriving an indicative temperature of the LED from a sensor temperature obtained from a temperature sensor, the temperature sensor being thermally coupled to the LED,
c) measure a value of the first electrical quantity,
d) deriving an expected value of the first electrical quantity from the indicative temperature of the LED, the predetermined value of the second electrical quantity, and a predetermined relation between the expected value of the first electrical quantity and at least one of LED temperature and the predetermined value of the second electrical quantity,
e) determining if the measured value of the first electrical quantity deviates from the expected value of the first electrical quantity, and
f) establishing, based on the determination, if an LED approaching end of life warning is to be generated, and
g) outputting the LED end of life warning in case the LED approaching end of life warning has been generated.

In an embodiment, the method may be defined as:

A method of driving an LED to operate the LED at a first electrical quantity and at a second electrical quantity, wherein the first electrical quantity is one of a voltage across the LED and a current through the LED and the second electrical quantity is the other one of the voltage across the LED and the current through the LED, the method comprising a) controlling a power supply to provide a predetermined value of the second electrical quantity to power the LED, the predetermined value of the second electrical quantity being set to operate the LED below a knee voltage of the LED,
b) deriving an indicative temperature of the LED from a sensor temperature obtained from a temperature sensor, the temperature sensor being thermally coupled to the LED,
c) measure a value of the first electrical quantity,
d) deriving an expected value of the first electrical quantity from the indicative temperature of the LED, the predetermined value of the second electrical quantity, and a predetermined relation between the expected value of the first electrical quantity and at least one of LED temperature and the predetermined value of the second electrical quantity,
e) determining if the measured value of the first electrical quantity deviates from the expected value of the first electrical quantity comprising, in case the first electrical quantity is the voltage across the LED and the second electrical quantity is the current through the LED, determining if the measured voltage increased in respect of the expected value, and in case the first electrical quantity is the current through the LED and the second electrical quantity is the voltage across the LED, determining if the measured current through the LED decreased in respect of the expected value, and f) establishing, based on the determination, if an LED approaching end of life warning is to be generated, from an increase of the measured voltage in respect of the expected value, in case the first electrical quantity is the voltage across the LED and the second electrical quantity is the current through the LED, respectively from an decrease of the measured current through the LED in respect of the expected value, in case the first electrical quantity is the current through the LED and the second electrical quantity is the voltage across the LED, and g) outputting the LED approaching end of life warning in case the LED approaching end of life warning has been generated.

Accordingly, in f) an LED approaching end of life warning is generated from an increase of the measured voltage in respect of the expected value, in case the first electrical quantity is the voltage across the LED and the second electrical quantity is the current through the LED, respectively from a decrease of the measured current through the LED in respect of the expected value, in case the first electrical quantity is the current through the LED and the second electrical quantity is the voltage across the LED.

In the case of driving the LED at a predetermined LED current, the method may be phrased as: a method of driving an LED, the method comprising a) driving a power supply to provide an LED driving current to power the LED, the LED driving current being set to operate the LED below a knee voltage of the LED,
b) deriving an indicative temperature of the LED from a sensor temperature obtained from a temperature sensor, the temperature sensor being thermally coupled to the LED,
c) measure a voltage across the LED,
d) deriving an expected voltage across the LED from the indicative temperature of the LED, the LED driving current, and a predetermined relation between the expected LED voltage and at least one of LED temperature and LED driving current,
e) determining if the measured voltage across the LED exceeds the expected voltage across the LED, and
f) establishing, based on the determination, if an LED approaching end of life warning is to be generated, and
g) outputting the LED end of life warning in case the LED approaching end of life warning has been generated.

With the disclosed method, the same or similar effects may be achieved as with the disclosed LED driver. Also, the same or similar embodiments, as described with reference to the LED driver, may apply to the disclosed method, achieving the same or similar effects.

BRIEF DESCRIPTION OF THE DRAWINGS

Further features, effects and advantages of the disclosed invention may become apparent from the appended drawing, showing a non-limiting embodiment of the disclosure, wherein.

DETAILED DESCRIPTION

Figure 1:
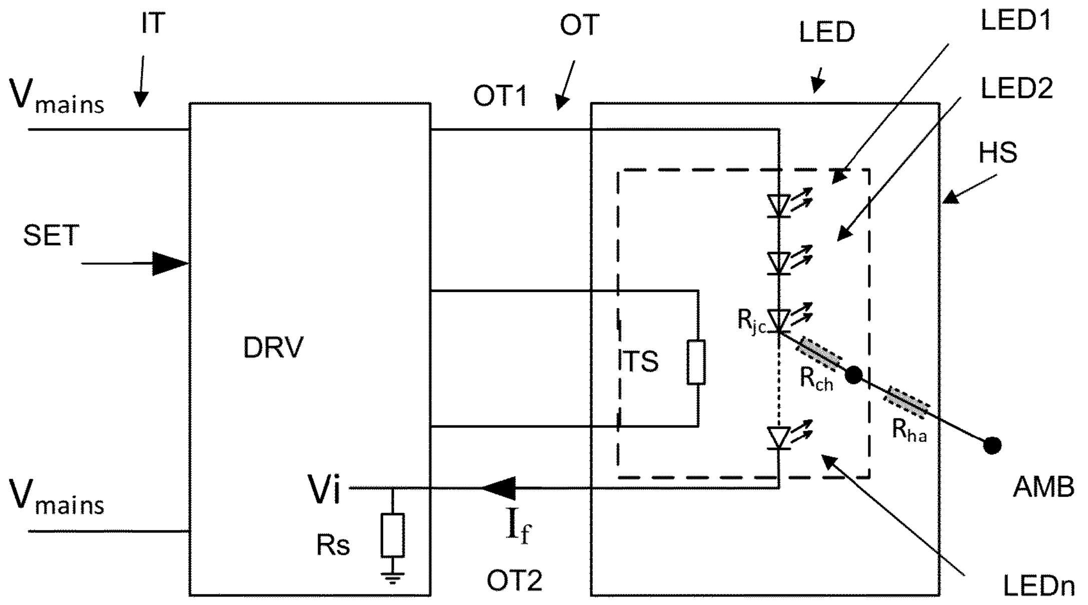
FIG. 1 depicts a driver circuit in accordance with an embodiment of the invention.

It is noted that throughout the figures, the same or similar reference numerals refer to the same or similar features.

FIG. 1 depicts an LED driver DRV comprising a power input in the form of power input terminals IT, to be connected to a power supply such as an AC supply voltage, for example an AC mains voltage Vmains, a transformed AC mains voltage at a secondary side of a mains transformer, a DC supply voltage such as supplied by a battery or by a DC power supply network, etc. The LED driver comprises a driving output OT to be connected to an LED. In FIG. 1, the LED driver is connected to a series connection of LEDs: LED1, LED2, . . . LEDn. The LEDs are mounted to a heat sink HS in order to sink heat generated by the LEDs during operation. A thermal resistance between the casing of the LEDS and the heat sink being denoted as Rch, a thermal resistance of the heat sink to ambient being denoted as Rha. The LEDs are electrically connected to the driver, whereby one terminal of the series connected LEDs (anode) is connected to a first output terminal OT1 of the driver while the other terminal of the series connected LEDs (cathode) is connected to a second output terminal OT2 of the driver.

Alternatively, the other terminal OT2 of the LEDs is connected to ground, where the driver being single ended. The driver is configured to provide an LED drive current (also denoted as LED driving current or LED current or driver output current) to the LEDs. Thereto, in the present example, a current measurement device being comprised in the driver in order to measure the LED drive current as flowing through the LEDs. In the present example, the current measurement device is formed by the series Resistor Rs effectively connected in series with the LEDs. The driver may measure a voltage Vi across the series Resistor Rs. The current measurement may be performed at the low (return) side as depicted in FIG. 1, or alternatively, the current measurement may be performed at the high side, which may for example enable the diodes to be connected to ground at the cathode side.

The LED driver comprises a control device CD such as a microcontroller, for example a single chip microcontroller or other programmable device. The control device may be provided with suitable program instructions in order to perform the functions as will be described in more detail further below.

The control device is provided with a measurement input, such as a voltage measurement input to measure a voltage across the LED. A differential voltage Vf−Vi may be measured, for example in that the control device measures a voltage at the high (current supply) side of the LED, i.e. OT1, and at the low side (current return side) of the LED, i.e. OT2, which voltage Vi may be measured anyhow in case of presence of the depicted current measurement resistor. Alternatively, a differential measurement circuit may be provided, e.g. by means of a differential amplifier, to measure a differential voltage across the LED.

The control device is further provided with a temperature sensor input TS to which a temperature sensor TS is connected. The temperature sensor TS is in the present example mounted to the heatsink thereby being thermally coupled with the LED. The temperature sensor may for example comprise an NTC (i.e. a resistive element having a negative temperature coefficient) a PTC ((i.e. a resistive element having a positive temperature coefficient), a semiconductor junction (a forwardly biased semiconductor junction exhibiting a temperature dependent forward voltage), or any other suitable temperature sensor.

The control device may receive instructions for operating the LED in any suitable way. For example, the control device may be provided with a setpoint input SET (e.g. digital or analogue) to which LED setpoint data is provided. Alternatively, instructions may be transmitted to the LED driver, in particular to the control device, by a digital communication bus, such as an illumination system communication bus, such as Digit Addressable Lighting Interface, DALI, a wireless DALI, a Digital Signal Interface, DSI, or any other suitable communication interface.

Figure 2A:
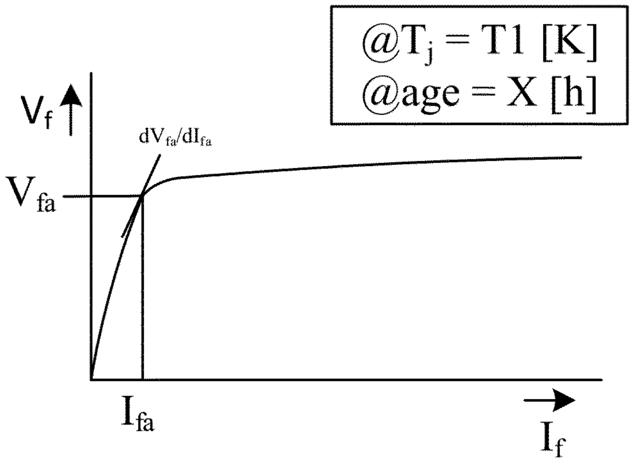
FIG. 2*a* depicts a graph of LED forward voltage versus LED current

FIG. 2A depicts a curve of LED forward voltage Vf versus forward LED current If. The curve is depicted at a junction temperature Tj of T1 and at a accumulated operational age of the LED of X hours. T1 and X may be suitable values within normal LED operating conditions. The curve of the forward voltage Vf versus the current If first shows a relatively fast rise of the forward voltage as the LED current rises from zero, until a voltage is reached where the LED diode junction starts to conduct, causing a less steep increase of the LED voltage as the LED forward current rises. Thus, a curve is shown that exhibits a knee at the transition from the non-conducting to the conducting state. Below the knee, the forward voltage typically relates to the forward current at a dVf/dIf (e.g. delta Vf/delta If) of 0.25 to 0.35 Volt per Ampere for a typical LED.

Figure 2B:
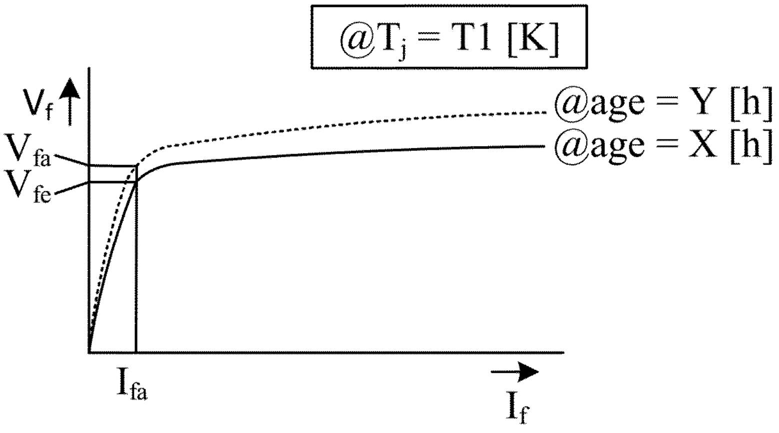
FIG. 2*b* depicts a graph of LED forward voltage versus LED current at different ages of the LED

FIG. 2B depicts a similar curve as FIG. 2A, adding by a dotted line the same curve for another age of the LED, i.e. the age Y. As shown in FIG. 2B, the dotted curve provides, at the same forward currents, for higher forward voltages. The age Y may exceed the age X, thus the forward voltage of the LED may increase, at a same forward current and temperature, at an increased age. The term age may be understood as an accumulated operational use of the LED. Use of the LED at elevated conditions (temperature, output power) may result in a more fast aging of the LED).

Figure 3:
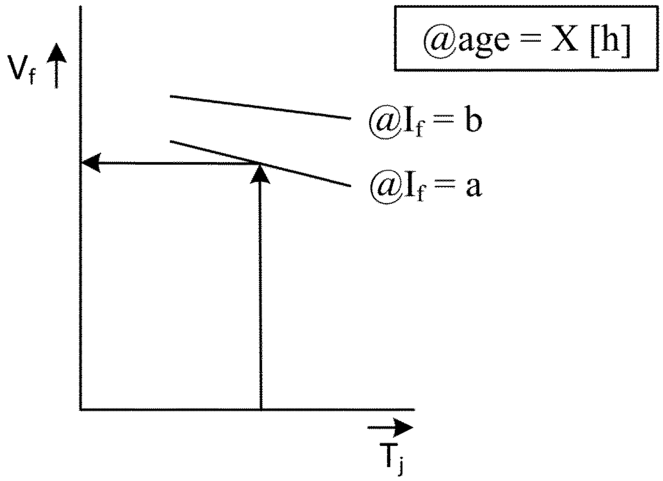
FIG. 3 depicts a graph of LED forward voltage versus LED junction temperature at different forward currents.

FIG. 3 depicts a curve of the LED forward voltage as a function of the LED junction temperature Tj. The curve (approximating a straight line over a certain range) shows that the Forward voltage Vf increases as the junction temperature decreases. The forward voltage typically relates to the junction temperature at a dVf/dTj (e.g. delta Vf/delta Tj) of −0.03 Volt per degree Centigrade for a typical LED. As shown in FIG. 3, as the higher forward current, for example at the forward current If=b, higher forward voltages result at a same junction temperature Tj, thus providing for a higher curve of Vf versus Tj at a higher forward current.

Figure 4:
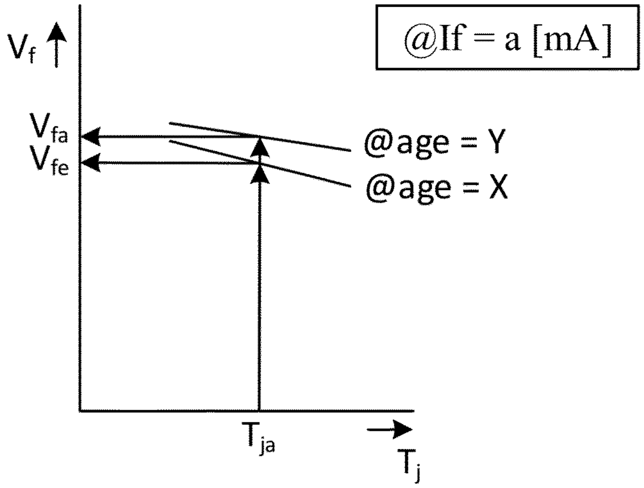
FIG. 4 depicts a graph of LED forward voltage versus LED junction temperature at different ages of the LED.

FIG. 4 depicts a curve of LED forward voltage Vf versus junction temperature Tj at different ages of the LED. In the curves, the forward current If is kept constant. The curves show that the forward voltage decreases as the junction temperature increases, similar to FIG. 3, while further showing that the curve rises as the LED ages: the curve at age Y provides, at the same junction temperature, for a higher forward voltage Vf at the same junction temperature and at the same forward current.

Using the dependencies of LED forward voltage, LED forward current, LED junction temperature and LED age, as described above, an age of the LED may be estimated, as described in more detail below.

For example, a mathematical relation may be defined where Vf=R(If, Tj, age). This relation describes the Vf in dependency of all possible combinations of If, Tj and age across their ranges. For practical use, a threshold Vf-th may be determined from relation R which, when surpassed by a difference between the actual forward voltage and the expected forward voltage, i.e. Vfa−Vfe, may trigger a message to the user or service technician that LEDs or fixture need to be replaced to prevent End Of Life, EOL.

This Vf-th can be a function of Tj [assuming a constant Ifa=If−measurement (ifm)].

The Vf may be dependent on the junction temperature. The junction temperature may be strongly dependent on the forward current If and fluctuations therein. At currents below the knee of the LED Vf=f(If) curve, steady state junction temperature may be rather constant. It may therefore be advantageous to measure at an If-measurement below the knee of this curve. A number of contemporary LED drivers may generate low currents which are under the knee current and where Vf is large enough to be measured accurately enough to detect changes in Vf caused by aging of the LEDs.

Figure 5:
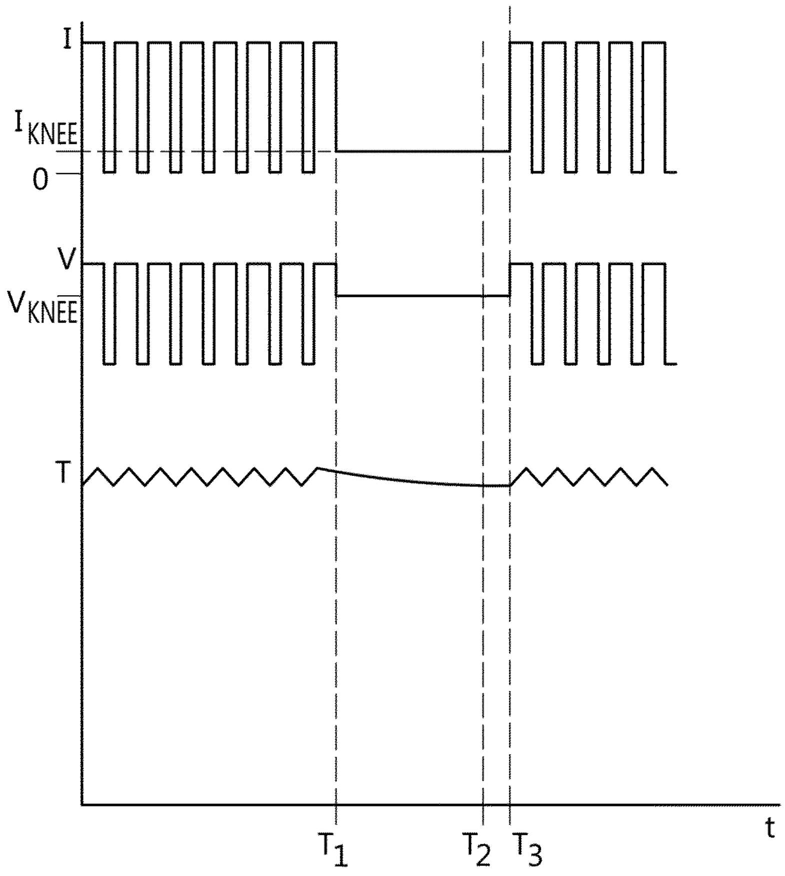
FIG. 5 depicts a time diagram of LED driving and measurement.

The present invention may use these dependencies in the driver as follows:

The driver, in particular the control device thereof, performs the following, a. generating an Ifm below the Ifknee.
b. measuring the temperature of the temperature sensor and given the known thermal resistances,
c. calculating the indicative junction temperature Tja of the LED chain.
d. deriving the expected Vfe from the curve shown in FIG. 4 (or the curve shown in FIG. 2*b*) using the Tja
e. measuring the actual Vfa
f. comparing the difference Vfa−Vfe to a predetermined threshold Vf-th, which may be a function of the forward current and/or the junction temperature, i.e. f(If, Tj)
g. signaling imminent end of life (EOL) to for example a user or a service technician An embodiment is described with reference to FIG. 5. FIG. 5 depicts a diagram of the LED driving current, the LED voltage and the measured temperature versus time, as applied by the LED driver described with reference to FIG. 1. Applying a pulsed LED current, the junction temperature itself may change quickly, e.g. the junction temperature may rise during each current pulse and cool down after each pulse, while the measured temperature may respond more slowly to junction temperature changes, and may therefore show a more constant behavior.

The LED driver initially drives the LED to operate at in a modulation cycle, such as in a pulse width modulation, a pulse frequency modulation or any other suitable modulation. The LED thereby operates to provide an intensity in accordance with a received setpoint. For example, the LED may be a white LED, whereby the modulation serves to set an intensity level, As another example, the LED may be a cool or warm white LED in an assembly of a warm white and a cool white LED, whereby the modulation further serves to set a color temperature. At time T1, the LED current, i.e. the LED driving current as provided by the LED driver, is set to an LED driving current that provides that the LED operates at or just below the knee voltage Vknee of the LED (the knee voltage having been explained with reference to FIGS. 2*a* and 2*b*). Accordingly, the LED may not be emitting light. As the associated LED driving current is low, a junction temperature of the LED will decrease. At the time T2, a temperature is measured by the temperature sensor TS. Also, at or near T2, a voltage Vied across the LED is measured by the control device. The control device derives an estimated, indicative temperature of the LED, i.e. the LED junction, from the measured temperature. Thereto, the control device may use the thermal resistance between the LED junction and the LED casing, the thermal resistance between the LED casing and the LED heat sink, the thermal resistance between the Led heat sink and the temperature sensor. Furthermore, for a more accurate estimation, use may be made of the dissipation by the LED in order to model the dissipation by the LED junction as a result of the current that operates the LED just below the knee voltage. Hence, using the dissipation by the LED (in Watts), and the thermal resistances from the LED junctions to the temperature sensor (in degrees Centigrade per Watt), the indicative LED junction temperature may be calculated from the measured temperature of the temperature sensor, the thermal resistance between temperature sensor and LED junction the dissipation at the LED junction. Due to thermal capacitance, it may take some time after the LED temperature has stabilized, as represented by the time between T1 and T2.

Having determined the indicative temperature of the LED junction, the control device determines an expected voltage across the LED. Thereto, the determined junction temperature and the LED driving current are applied as input parameters, as following the behavior explained with reference to FIGS. 2-4, the LED forward voltage is temperature and current dependent. The control device may store in a memory thereof a mathematical relation between voltage across the LED, junction temperature and LED driving current. Alternatively, a lookup table may be stored in memory in order for the control device to look up an expected forward voltage. In an embodiment, the expected forward voltage may be expressed as a function of the LED temperature, the LED driving current or both LED temperature and the LED driving current. The LED temperature alone may suffice in case the determination is always performed at a same LED driving current (which may amongst others be the case when all LEDs as may be applied exhibit the knee in the V, I curve at substantially the same point). The LED driving current alone may be applied in case the LED temperature would either be held constant, e.g. by active cooling, or in case the thermal relations between cooling body and LED would be designed in such a way that the temperature would directly follow from the LED current (for example at a relatively high LED driving current, e.g. above the knee, a dissipation as a result of the LED driving current and the thermal behavior of the heat sink, may set the LED temperature).

The control device compares the expected forward voltage Vfe of the LED to the actual, measured forward voltage Vfa of the LED, as depicted in FIG. 4. As described with reference to FIG. 4, the LED voltage may rise as the LED ages. Thus, in case the LED voltage exceeds the expected voltage by a threshold, a warning that an end of life of the LED may be approaching, may be generated and output. The threshold may be a single, predetermined value. In another embodiment, the threshold may be dependent on temperature and LED current, thus to take account of the behavior of the LED at different temperatures and LED currents, as follows from FIGS. 2-4. The dependency may be stored in a memory of the control device in a form of a mathematical function or a lookup table.

The warning may be output by the control device in the form of a message sent via a communications interface, e.g. a DALI interface, to a remote server, such as a server running a remote maintenance application. The message may trigger a service technician to exchange the LED before the end of life is reached, or may result in the LED driver to operate the LED at lower intensity in order to, for example, use a remaining lifetime as effective as possible thus to extend a lifetime until replacement of the LED takes place. The warning may also be output optically by the driver, e.g. making the LED to signal that it needs service, e.g. by blinking or any other suitable signaling.

After having measured the voltage across the LED and the temperature, the control device may proceed to resume normal operation of the LED driver thereby driving the LED to emit light, as schematically indicated in FIG. 5 where the pulsed operation of the LED is resumed at T3. In order to keep the "off time" from T1 to T3 as short as possible, the remaining steps as described above may be performed after T3 if desired.

As a temperature change of the LED junction may result in a relatively large change of the voltage across the LED, the above described age determination shows to be highly sensitive to temperature errors. Hence, verification of the (measured) temperature of the LED junction is desired. The determination of the temperature if the LED junction may be verified in various ways.

As a first example of verification of the temperature measurement, after having set the LED driving current to the knee current or below the knee current, the voltage across the LED may be repetitively measured. The control device may then determine if the voltage across the LED is stable. As the change of the temperature of the LED reflects into a change of voltage across the LED (keeping the LED driving current constant) a short term fluctuation in LED voltage reflects a short term temperature fluctuation. Thus, the control device may wait until the voltage across the LED appears to be constant, thus indicating that the temperature of the LED appears to be constant. As a result, effects of thermal delay, e.g. a long thermal time constant of the heat sink, resulting in a relatively slow decay, or effects of the dissipation of nearby other LEDs on the temperature of the heat sink, affecting a junction temperature of the LED, may be taken into account.

As a second example of verification of the temperature measurement, the fact that the LED forward voltage depends on temperature may be applied to measure the temperature of the LED. The control device may make use of a stored curve that expresses the LED forward voltage as a function of temperature (and optionally as a function of LED current). Thereto, the same curve or lookup table as described above to estimate the expected voltage across the LED may be applied, however in "reverse" direction, i.e. from voltage to temperature instead of from temperature to voltage. Accordingly, when the LED voltage has been measured by the control device, the control device may apply the stored relation between voltage and temperature to obtain an indication of the temperature from the voltage measurement (thereby for the time being disregarding age effects). In case the thus approximated junction temperature equals or nears the junction temperature as derived from the temperature sensor measurement, the temperature measurement by the temperature sensor may be considered validated. Otherwise, in case the temperature as derived from the voltage measurement appears to deviate from the junction temperature as derived from the temperature sensor output, the control device may wait for the temperature to stabilize and then repeat the determination, or proceed with normal tasks to perform the above described processes at another moment in time.

As described above, the determination is performed during an LED off time in the LED modulation scheme. Alternatively, the determination may be performed during a power up procedure, i.e. an initialization procedure whereby the LED driver is starting operation when the power is switched on.

In order to take account of individual tolerances of the LED forward voltage, the forward voltage may be measured, e.g. when the LED is taken into operation for the first time, or after a certain amount of operating hours counted from the moment that the LED is taken into operation for the first time. The measured forward voltage at a known LED forward current, i.e. LED driving current and at a known junction temperature, may be stored in the memory of the control device. The stored value may be used as a parameter to calibrate a stored relation between LED forward voltage, temperature and current, for example by multiplying the stored relation (function or lookup table) by a calibration factor derived from e.g. the stored value in respect of the expected value of the voltage according to the stored relation between LED forward voltage, temperature and current.

Figure 6A:
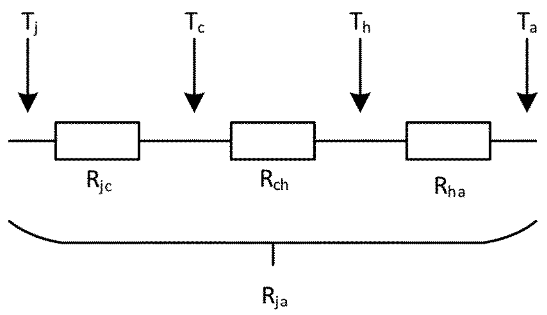
FIGS. 6A and 6B depict thermal resistance networks modelling a thermal resistance.

As a reference for thermal resistance networks:

For determining the junction temperature Tj, the thermal resistance network as depicted in FIG. 6A may be applied, associated with a dimensioning of heatsinks.

Where:

Tj=the junction temperature of the considered component (here LED) in [K]

Tc=the case temperature of the considered component in [K]

Th=the temperature of the heatsink in [K]

Ta=the ambient temperature in [K]

(more exact would be to also model the thermal resistance between the heatsink and the driver enclosure and between the driver enclosure and ambient).

Rjc=thermal resistance between junction and case in [K/W]

Rch=thermal resistance between case and heatsink in [K/W]

Rha=thermal resistance between heatsink and ambient in [K/W]

Rja=thermal resistance between junction and ambient in [K/W]

Figure 6B:
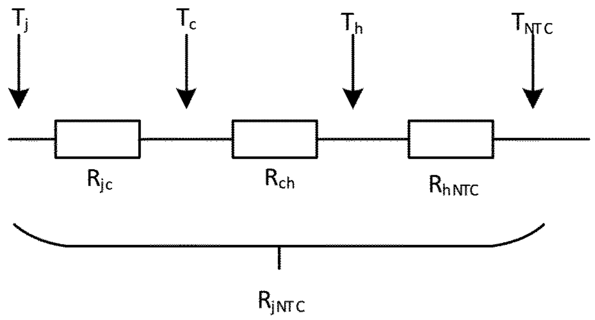

Similarly the following thermal resistance network as depicted in FIG. 6B may be applied, associated with deriving Tj when TNTC is known.

Where:

Tj=the junction temperature of the considered component (here LED) in [K]

Tc=the case temperature of the considered component in [K]

Th=the temperature of the heatsink in [K]

TNTC=the temperature as measured by the NTC in [K]

Rjc=thermal resistance between junction and case in [K/W]

Rch=thermal resistance between case and heatsink in [K/W]

RhNTC=thermal resistance between heatsink and NTC in [K/W]

RjNTC=thermal resistance between junction and NTC in [K/W]

The invention claimed is:

1. An LED driver for driving an LED, the LED driver comprising a power supply configured to power the LED, a control device configured to control the power supply to power the LED to operate the LED at a first electrical quantity and at a second electrical quantity, wherein the first electrical quantity is one of a voltage across the LED and a current through the LED and the second electrical quantity is the other one of the voltage across the LED and the current through the LED, wherein the control device comprises a measurement input connected to the LED and configured to measure the first electrical quantity, and a temperature sensor thermally coupled to the LED and configured to measure a temperature indicative of a temperature of the LED, the temperature sensor comprising an outputconnected to a temperature measurement input of the control device, wherein the control device is configured to:

a) control the power supply to power the LED thereby driving the LED to operate at a predetermined value of the second electrical quantity, the predetermined value of the second electrical quantity being set to operate the LED below a knee voltage of the LED, b) derive an estimated temperature of the LED from the temperature measured by the temperature sensor, c) measure, by the measurement input, a value of the first electrical quantity, d) derive an expected value of the first electrical quantity from the estimated temperature of the LED, the predetermined value of the second electrical quantity, and a predetermined relation between the expected value of the first electrical quantity and at least one of estimated temperature of the LED and the second electrical quantity, e) compare the measured value of the first electrical quantity to the expected value of the first electrical quantity;

f) determine if the measured value of the first electrical quantity deviates from the expected value of the first electrical quantity, comprising:

in case the first electrical quantity is the voltage across the LED and the second electrical quantity is the current through the LED, determine if the measured voltage increased in respect of the expected value of the first electrical quantity, wherein the expected value of the voltage across the LED is the expected forward voltage across the LED when the LED is new or mid-life, and in case the first electrical quantity is the current though the LED and the second electrical quantity is the voltage across the LED, determine if the measured current through the LED decreased in respect of the expected value, wherein the expected value of the current through the LED is the expected current through the LED when the LED is new or mid-life, and g) establish, based on the determination in f), if an LED approaching end of life warning is to be generated, comprising generate the end of life warning from an increase of the measured voltage in respect of the expected value, in the case the first electrical quantity is the voltage across the LED and the second electrical quantity is the current through the LED, respectively, from a decrease of the measured current through the LED in respect of the expected value, in the case the first electrical quantity is the current through the LED and the second electrical quantity is the voltage across the LED, and h) the LED approaching end of life warning when the LED approaching end of life warning has been generated.

2. The LED driver according to claim 1, wherein the temperature sensor is thermally connected to a heat sink of the LED, and the control device is configured to derive the estimated temperature of the LED by estimating a junction temperature of the LED from the temperature as measured by the temperature sensor and a thermal resistance from the LED junction to the heat sink, the thermal resistance from the LED junction to the heat sink being stored in a memory of the control device.

3. The LED driver according to claim 2, wherein the control device is further configured to estimate the LED junction temperature from an estimated dissipation of the LED, the control device being configured to estimate the dissipation from the measured value of the first electrical quantity and the predetermined value of the second electrical quantity.

4. The LED driver according to claim 1, wherein the control device is further configured to compare the measured value of the first electrical quantity to the expected value of the first electrical quantity, the comparison comprising:

determining if the measured value of the first electrical quantity exceeds the expected value of the first electrical quantity by a predetermined voltage threshold when the first electrical quantity is the voltage across the LED, and determining if the measured value of the first electrical quantity underceeds the expected value of the first electrical quantity by a predetermined current threshold when the first electrical quantity is the current through the LED.

5. The LED driver according to claim 4, wherein the predetermined voltage threshold and the predetermined current threshold are stored in a memory of the control device as a function of at least one of temperature of the LED and the second electrical quantity.

6. The LED driver according to claim 1, wherein the deriving the expected value of the first electrical quantity from the estimated temperature of the LED and the predetermined value of the second electrical quantity comprises:

fetching the expected value of the first electrical quantity from a memory having stored therein the expected value of the first electrical quantity at a junction temperature and the predetermined value of the second electrical quantity.

7. The LED driver according to claim 6, wherein the control device is configured to store the measured value of the first electrical quantity in the memory upon receiving a calibration command.

8. The LED driver according to claim 1, wherein the control device is configured to perform a)-c) during a power-up procedure of the LED driver.

9. The LED driver according to claim 1, wherein the control device is configured to perform a)-c) during an LED off time in an LED modulation cycle.

10. The LED driver according claim 1, wherein a relation between the first electrical quantity and temperature is stored in a memory of the control device, the control device further being configured to:

derive a further indicative temperature of the LED from the measured value the first electrical quantity and the stored relation between the first electrical quantity and temperature, compare the estimated temperature of the LED to the further indicative temperature of the LED, and perform d) to h) in case a difference between the estimated temperature of the LED and the further indicative temperature of the LED is less than a predetermined temperature stability threshold.

11. The LED driver according to claim 1, wherein the control device is further configured to measure the value of the first electrical quantity at a first moment in time and to measure the value of the first electrical quantity at a second moment in time which is later than the first moment in time, to derive a time gradient of the first electrical quantity from a difference between the value of the first electrical quantity at the first moment in time and the value of the first electrical quantity at the second moment in time and an elapsed time between the first moment in time and the second moment in time, and to perform d) to g) when the time gradient of the value of the first electrical quantity is lower than a predetermined gradient.

12. A method of driving an LED to operate the LED at a first electrical quantity and at a second electrical quantity, wherein the first electrical quantity is one of a voltage across the LED and a current through the LED and the second electrical quantity is the other one of the voltage across the LED and the current through the LED, the method comprising:

a) controlling a power supply to provide a predetermined value of the second electrical quantity to power the LED, the predetermined value of the second electrical quantity being set to operate the LED below a knee voltage of the LED, b) deriving an estimated temperature of the LED from a temperature obtained from a temperature sensor, the temperature sensor being thermally coupled to the LED, c) measure a value of the first electrical quantity, d) deriving an expected value of the first electrical quantity from the estimated temperature of the LED, the predetermined value of the second electrical quantity, and a predetermined relation between the expected value of the first electrical quantity and at least one of the estimated temperature of the LED and the predetermined value of the second electrical quantity, e) comparing the measured value of the first electrical quantity to the expected value of the first electrical quantity, f) determining if the measured value of the first electrical quantity deviates from the expected value of the first electrical quantity, comprising:

in case the first electrical quantity is the voltage across the LED and the second electrical quantity is the current through the LED, determine if the measured voltage increased in respect of the expected value of the first electrical quantity, wherein the expected value of the voltage across the LED is the expected forward voltage across the LED when the LED is new or mid-life, and in case the first electrical quantity is the current though the LED and the second electrical quantity is the voltage across the LED, determine if the measured current through the LED decreased in respect of the expected value, wherein the expected value of the current through the LED is the expected current through the LED when the LED is new or mid-life, and g) establishing, based on the determination in f), if an LED approaching end of life warning is to be generated, wherein the LED approaching end of life waring is generated:

from an increase of the measured voltage in respect of the expected value, in case the first electrical quantity is the voltage across the LED and the second electrical quantity is the current through the LED, respectively, from a decrease of the measured current through the LED in respect of the expected value, in case the first electrical quantity is the current through the LED and the second electrical quantity is the voltage across the LED, and h) outputting the LED approaching end of life warning when the LED approaching end of life warning has been generated.

* * * * *